Oct. 6, 1959 P. P. A. VALETTE 2,907,363

BINOCULAR CASES

Filed April 30, 1957 3 Sheets-Sheet 1

Oct. 6, 1959 P. P. A. VALETTE 2,907,363

BINOCULAR CASES

Filed April 30, 1957 3 Sheets-Sheet 2

Oct. 6, 1959 P. P. A. VALETTE 2,907,363

BINOCULAR CASES

Filed April 30, 1957 3 Sheets-Sheet 3

2,907,363

BINOCULAR CASES

Pierre Paul André Valette, Cuise-la-Motte, France

Application April 30, 1957, Serial No. 656,119

5 Claims. (Cl. 150—52)

This invention relates to binocular cases.

An object of the invention is to provide an improved case for binoculars or field glasses which is constructed in such a manner as to enable the instrument to be used without removing it from the case while still permitting the so-called "breaking" of the binoculars for adjusting the inter-eye distance.

The case of the invention is essentially characterised in that it comprises a flexible body in one piece, of a generally rectangular or trapezoidal form presenting two symmetrical halves having two oppositely-directed and symmetrical side flaps which, after said halves have been folded over the instrument to enclose the same, are passed through slots in said case body and attached by their ends to the back thereof by suitable means such as buttons or press-studs.

Such a case body is, consequently, distinguished by particular simplicity of form and manufacture compared with cases intended for the same purpose in which the instrument is held in the case by a separate element, distinct from the case body, and provided to hold the middle part or hinge of the instrument.

The body of the case according to the present invention is supplemented by a lid or cap for covering or uncovering the eyepieces which also acts as a rain-shield when the case is held open; as well as a bottom cover or cap protecting the objective glasses of the instrument.

Other features of the case according to the invention will appear from the following detailed description aided by the accompanying drawings which show a representative but not an exclusive form thereof. On the drawings.

Figure 1:
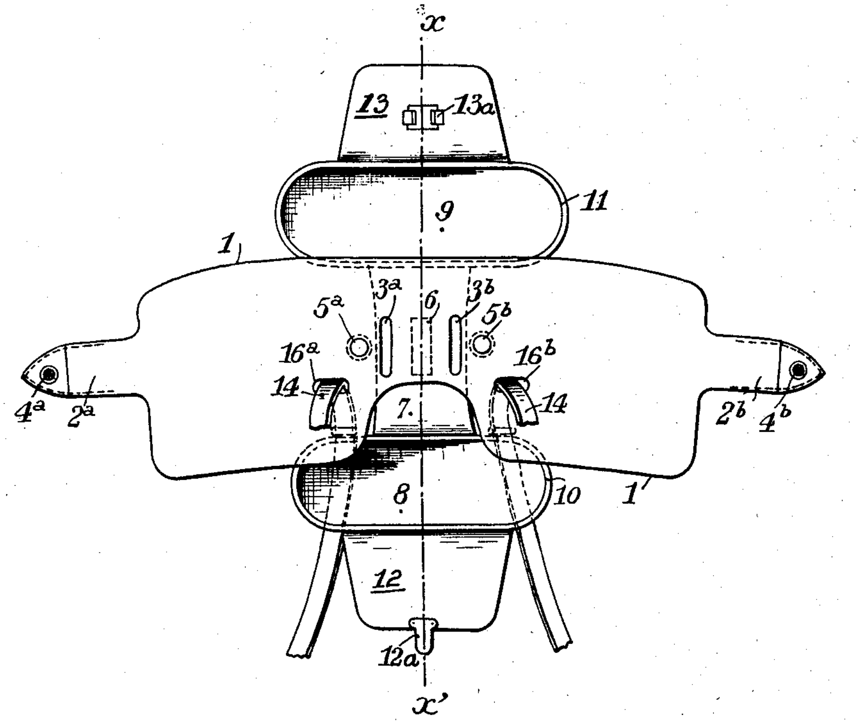
Fig. 1 is a plan view of the case with the body thereof opened and laid flat.

The case body 1, of which Fig. 1 shows the inside, has two symmetrical side flaps 2a, 2b, and two slots 3a, 3b near and on both sides of the centre line *x—x'*. Said flaps are provided with closure means which in the particular example are press-studs 4a, 4b that co-act with sockets 5a, 5b attached to the outside back of the case body.

The same back or rear part has attached thereto, for instance by a line of stitching 6, a central flap or cross-piece 7 which connects the lid or top cap 8 with the bottom cap 9 of the case, and links them to the case body. By virtue of its flexibility, said cross-piece 7 allows said caps 8 and 9 to be opened and closed at will.

Figure 2:
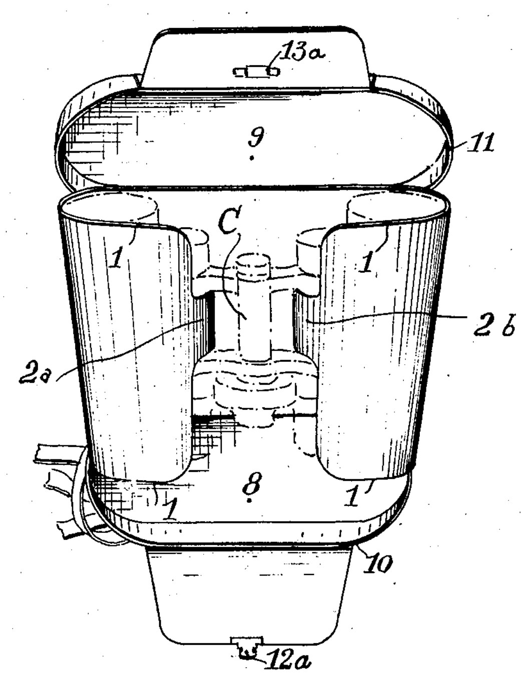
Fig. 2 is a corresponding perspective top view of the case opened, with the binoculars in position and secured.
Figure 3:
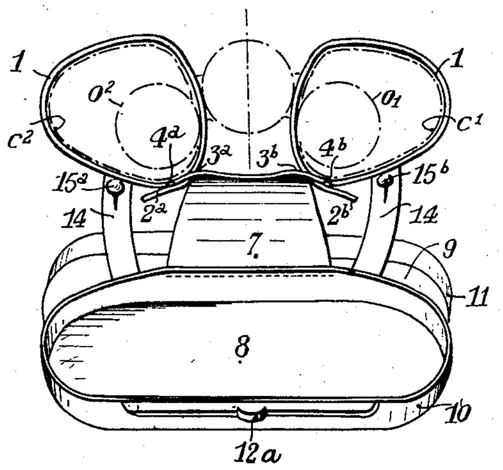
Fig. 3 is an end view showing the case open with the instrument in the position for use.
Figure 4:
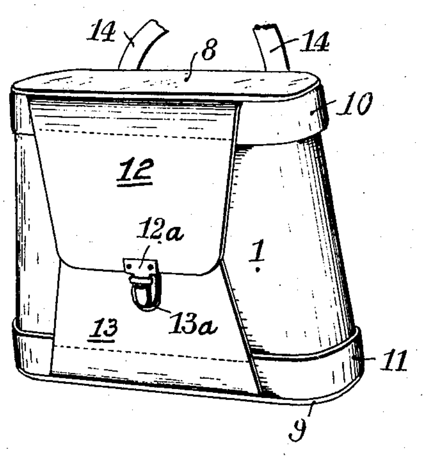
Figs. 4 and 5 are perspective views of the case when closed, respectively from the front and the back.
Figure 5:
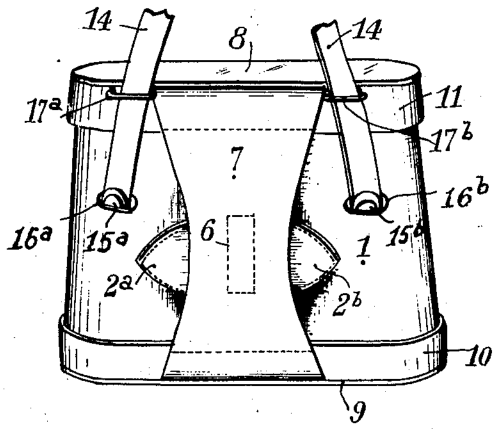

The manner of inserting and securing the binoculars in the case is clearly apparent from Figs. 2 and 3. Having placed the instrument on the inner surface of the opened case body so that the hinge C (Fig. 2) of the instrument is on the centre line *x—x'* (Fig. 1) with the eyepieces $O_1$, $O_2$ towards the lid 8 and the objectives towards the bottom cap 9, the parts of the case body on either side of the centre line are lifted and folded towards the centre round the barrels $C_1$, $C_2$ of the instrument in such a manner as to enclose the latter. The flaps 2a, 2b are then passed through the slots 3a, 3b and the press-studs 4a, 4b are engaged in the sockets 5a, 5b on the back of the case. It will be seen (Fig. 2), that the hinge C of the instrument is not employed to secure the instrument in the case.

To close the case completely, it is sufficient to shut down the top and bottom caps 8 and 9 and lock the two together by any suitable means, such as extension flaps 12, 13. The top and bottom caps are provided with rims that extend over the case body when in the closed position and with mating locking devices 12a and 13a.

When the case is open for use, i.e. for viewing or observation, the body 1 and the caps 8 and 9 are held together by the cross-piece 7, and leave the field of view entirely unobstructed.

According to a further feature of the invention, the ends of the carrying strap 14 of the case are attached, not to the case itself, but to the instrument, being buckled at 15a, 15b to rings or shackles thereon after being passed through slotr 16a, 16b. This same strap is further connected with the top cap 8 by being passed through loops 17a, 17b attached thereto. This arrangement holds the case in position and prevents it from swinging, and also ensures that the cap 8 automatically closed over the eyepieces, thus protecting them when the case is left open but the instrument is not being used for viewing.

As mentioned in the introduction to this specification, the case does not obstruct the "breaking" of the binoculars in order to adjust the eye spacing, in view of the fact that the junction flap 7 between the top and bottom caps 8 and 9 is attached at the centre of the case and thus enables the flexibility of the case body or sheath proper, to be fully utilised.

The case may be made of leather or of any other suitable material, e.g. a plastic material or rubber or pasteboard.

What I claim is:

1. A case for binoculars including two tubular members hingedly connected, said case comprising a flat flexible body including a central portion, two end portions on opposite sides of said central portion and adapted to be folded into tubular shape to accommodate said tubular members, and flaps on the free outer extremities of said end portions, said body defining slots for accommodating said flaps with the end portions folded; top and bottom covers for engaging the folded end portions and closing off the same and a connecting portion connecting said covers and attached to said flexible body; said body defining openings, said case further comprising a strap having ends passing through the openings and engaged with said binoculars.

2. A case as claimed in claim 1 comprising engaging means on said flaps and body for releasably securing said flaps to said body.

3. A case as claimed in claim 1 wherein the openings are in the end portions and said strap engages the tubular members.

4. A case as claimed in claim 1 wherein said slots are in said central portion.

5. A case as claimed in claim 1 comprising further flaps on said covers, said further flaps having a length whereby with the case closed they overlap, and engaging means on said further flaps for locking the same together.

References Cited in the file of this patent

UNITED STATES PATENTS 2,813,564 Benz ---------------- Nov. 19, 1957

FOREIGN PATENTS 128,318 Sweden ---------------- May 13, 1950